Patented May 12, 1936

2,040,765

UNITED STATES PATENT OFFICE

2,040,765

PREPARATION OF ARYL-MERCURIC NITRATES AND A PRODUCT THEREOF

Edgar C. Britton, Ralph P. Perkins, and Joseph T. Lundquist, Midland, Mich., assignors to The Dow Chemical Company, Midland, Mich., a corporation of Michigan No Drawing. Application January 30, 1933, Serial No. 654,242

15 Claims. (Cl. 260—13)

The present invention concerns an improved method of preparing aryl-mercuric nitrates together with a new compound prepared by such method.

The usual method for preparing an aryl-mercuric nitrate is to react an aryl-mercuric chloride, e. g. phenyl-mercuric chloride, with silver nitrate, then to extract the aryl-mercuric nitrate product from the reacted mixture with alcohol, and finally to crystallize said product from the alcoholic extract. Such method embodies a number of disadvantageous features. For instance, the aryl-mercuric chloride reactant is in itself a difficult and expensive compound to prepare. Also, a costly silver salt is employed as a reactant. In order to employ such method economically on a commercial scale, added steps would be required to recover all silver salts from the reacted mixture and to reconvert said salts into silver nitrate so that they might be re-employed in the process. Still further, the aryl-mercuric nitrate product from such process usually is contaminated with traces of difficultly-separable silver salts and, as a result, tends to become dark colored when exposed to light.

We have now found that an aryl-mercuric salt of a lower fatty acid, e. g. an aryl-mercuric acetate, propionate, or butyrate, may be reacted directly with nitric acid to form the corresponding aryl-mercuric nitrate and that the latter may readily be isolated in good yield and in a form which is relatively stable toward light.

The invention, then, consists in the method and new compound hereinafter fully described and particularly pointed out in the claims, the following description and the examples setting forth in detail but several of the various ways in which the principle of our invention may be employed.

While an aryl-mercuric salt of a lower fatty acid, which is to be employed as a reactant in preparing the corresponding aryl-mercuric nitrate according to our method, may be prepared in any manner, we usually find it most convenient and economical to prepare such aryl-mercuric salt directly from the corresponding aromatic hydrocarbon. For instance, in preparing an aryl-mercuric acetate, an aromatic hydrocarbon is heated to a temperature between about 80° C. and 120° C. with a mixture or solution of mercuric oxide in concentrated (preferably glacial) acetic acid. In carrying out such reaction we prefer to employ the aromatic hydrocarbon and the acetic acid each in molecular excess over the quantity of mercuric oxide used. The aromatic hydrocarbon and acetic acid may be employed in any desired molecular ratio, but the yield of desired product is highest when the hydrocarbon is employed in excess.

The reacted mixture is cooled to about room temperature, or lower, and filtered to separate any undesirable by-products, e. g. poly-acetoxy-mercuri derivatives of the aromatic hydrocarbon. Most of the unreacted hydrocarbon and acetic acid may be distilled from the filtrate and the aryl-mercuric acetate may, if desired, be crystallized from the residual concentrated liquor. However, the primary purpose of such distillation is to remove most of the unreacted aromatic hydrocarbon. If the hydrocarbon which is to be removed distills at a lower temperature than does acetic acid, the distillation may advantageously be carried only to such point as to remove most of the hydrocarbon, thereby leaving a solution consisting substantially of the crude aryl-mercuric acetate in acetic acid. Again, if a higher boiling hydrocarbon is to be removed from the reacted mixture, the distillation may be carried to such point as to substantially remove both the unreacted aromatic hydrocarbon and the excess acetic acid and the still residue may then be diluted with a solvent which will permit ionization, e. g. alcohol, acetic acid, or a mixture of such solvents. The solution of crude aryl-mercuric acetate which is obtained by either of the above procedures may be employed directly in the preparation of an aryl-mercuric nitrate according to our method.

While, for the sake of clarity, the foregoing description has been restricted to the preparation of an aryl-mercuric acetate, an aryl-mercuric propionate or butyrate may be prepared by similar procedure using propionic or butyric acid, respectively, in place of acetic acid as a reactant.

A solution or mixture of an aryl-mercuric salt of a lower fatty acid in a solvent which will permit ionization of polar compounds (e. g. a solution such as that which is obtained by procedure described above) is treated with nitric acid, in amount representing at least the molecular equivalent of said aryl-mercuric salt, at a temperature between about −10° and 140° C. During such treatment, care should be taken to avoid oxidation of the organic reaction components, nitration of the aromatic nucleus, or splitting of the carbon-mercury linkage by the nitric acid.

The optimum temperature at which the treatment with nitric acid may be carried out so as to avoid oxidation and/or by-product formation and at the same time obtain the desired product in maximum yield is dependent both upon the particular aryl-mercuric salt which is used as a reactant and upon the concentrations of the various reactants in the reaction mixture. For instance, a concentrated solution of phenyl-mercuric acetate, in acetic acid may safely be treated with its molecular equivalent of 30 per cent aqueous nitric acid at 100° C. If either the nitric acid or the phenyl-mercuric acetate solution is more dilute, such treatment may be carried out at even a higher temperature. If a higher concentration of nitric acid is used, it may be necessary to carry the treatment out at a temperature below 100° C. On the other hand, when a concentrated solution of alpha-naphthyl-mercuric acetate in acetic acid is to be treated with its molecular equivalent of 70 per cent aqueous nitric acid, the treatment should be carried out at about 20° C. or lower in order to avoid oxidation and by-product formation. Again, if more dilute nitric acid is used, the treatment may safely be carried out at a higher temperature. Accordingly, the optimum temperature at which the reaction of nitric acid with an aryl-mercuric salt of a lower fatty acid may be carried out cannot be specified. However, when nitric acid oxidizes organic components of the reaction mixture, the latter becomes dark-colored and brown nitrogen oxide fumes are evolved. If such action is observed during the treatment with nitric acid, the mixture should quickly be cooled and/or diluted with a lower fatty acid or water.

The reaction of nitric acid with an aryl-mercuric salt of a lower fatty acid usually takes place very quickly when a true solution of the aryl-mercuric salt reactant is used. However, when a suspension of said reactant in a reaction solvent is employed the reaction mixture may advantageously be stirred for a considerable period of time in order to assure complete reaction.

After the treatment with nitric acid, water is added to the reaction mixture, preferably in amount sufficient to precipitate the aryl-mercuric nitrate product. The mixture may then be cooled and filtered to separate the crystalline product therefrom. The mother liquor remaining after such crystallization frequently contains an appreciable quantity of aryl-mercuric salts dissolved therein, due to the relative solubility of such salts in the free fatty acid which is present. In order to avoid loss of the product, it is, accordingly, sometimes advantageous to steam distill the free fatty acid from a reaction mixture which has been treated with nitric acid. Such steam distillation may be carried out either before or after removing a part of the product from the mixture. During the steam distillation, it is important that sufficient water be present in a reaction mixture to steam distill most of the fatty acid from said mixture before an appreciable quantity of nitric acid is distilled over. After removing fatty acid from a reaction mixture, the latter may be cooled to crystallize the aryl-mercuric nitrate product and the latter may be filtered from the mixture. The crystalline product is preferably washed with hot water to remove traces of mother liquor which may adhere thereto. If necessary, the product may be purified completely through recrystallization from a solvent such as alcohol, water, etc.

The following examples set forth several ways in which the principle of our invention has been employed. It is to be understood, however, that said examples are purely illustrative and are not to be construed as a limitation on the invention.

Example 1

A solution of 750 grams (3.45 moles) of mercuric oxide in 905 grams (15.1 moles) of glacial acetic acid was added to 6.5 liters (73.2 moles) of benzene and the mixture was heated to about 103° C. for 5 hours. The reaction mixture was then cooled to about 20° C., whereby relatively insoluble impurities, e. g. poly-acetoxy-mercuri-benzenes, were precipitated. The mixture was next filtered, then unreacted benzene was fractionally distilled from the filtrate to leave a solution of phenyl-mercuric acetate in acetic acid. The last mentioned solution was treated, at about 100 C., with 510 cubic centimeters (2.81 moles) of 29.5 per cent aqueous nitric acid. After the treatment with nitric acid, 1.8 liters of boiling water was added to the reaction mixture. The latter was then cooled to about room temperature to crystallize the phenyl-mercuric nitrate product. The crystalline product was filtered from the mixture, washed with about 2 liters of hot water, and dried. There was obtained 820 grams (2.42 moles) of nearly white phenyl-mercuric nitrate having a melting point of 181.5–184° C. The yield was 70 per cent of theoretical, based on the quantity of mercuric oxide used.

Example 2

A solution of 108.3 grams (0.5 mole) of mercuric oxide in 148 grams (2.0 moles) of propionic acid was added to 800 cubic centimeters (11.6 moles) of benzene and water was distilled from the mixture along with some benzene. The benzene layer of the distillate was returned to the reaction mixture and the latter was boiled under reflux for 18 hours. The reaction mixture was then cooled to 12° C. and filtered. Unreacted benzene was fractionally distilled from the filtrate to leave a solution of phenyl-mercuric propionate in propionic acid. The last mentioned solution was stirred and maintained at about 100° C. while 105 grams (0.5 mole) of hot 30 per cent nitric acid was added thereto. 600 cubic centimeters of hot water was then added to the reaction mixture, after which the latter was cooled to 12° C. to crystallize the phenyl-mercuric nitrate product. The crystalline product was filtered from the mixture, washed with 700 cubic centimeters of boiling water, and dried. There was obtained 105.9 grams of phenyl-mercuric nitrate, the yield thereof being 62.8 per cent of theoretical, based on the quantity of mercuric oxide used.

Example 3

A solution of 108.3 grams (0.5 mole) of mercuric oxide in 105 grams (1.75 moles) of glacial acetic acid was added to 320 grams (2.5 moles) of molten naphthalene and the resultant mixture was stirred and heated to a temperature between 104° and 117° C. for two hours. The reaction mixture was then steam distilled to remove unreacted naphthalene and the residual organic material was dissolved, as completely as possible, in 200 cubic centimeters of acetic acid. The acetic acid solution was filtered, at about room temperature, to remove relatively insoluble impurities therefrom. The filtrate was cooled and 38 cubic centimeters (0.61 mole) of 71 per cent aqueous nitric acid was added to the cooled solution while stirring and maintaining the latter at about 10° C. During addition of the nitric acid, crystals of the alpha-naphthyl-mercuric nitrate product were precipitated. The crystalline product was filtered from the mixture, washed successively with water and alcohol, then dried. There was obtained 107.2 grams (0.28 mole) of substantially pure alpha-naphthyl-mercuric nitrate. The yield thereof was 55 per cent of theoretical, based on the quantity of mercuric oxide used.

*Example 4*

35.4 grams (0.086 mole) of 4-biphenyl-mercuric acetate was dissolved in 184 grams of boiling glacial acetic acid. 13 cubic centimeters (0.21 mole) of 71 per cent aqueous nitric acid was then added to the hot solution. The reaction product was crystallized directly from the mixture by cooling the latter to about room temperature. The crystalline product was filtered from the mixture, washed with about 150 cubic centimeters of alcohol, and dried. There was obtained 21 grams (0.05 mole) of substantially pure 4-biphenyl-mercuric nitrate, the yield thereof being 58.7 per cent of theoretical based on the quantity of 4-biphenyl-mercuric acetate used. 4-biphenyl-mercuric nitrate is a new compound, having probably the formula:—

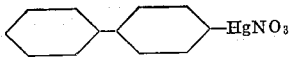

Said compound is practically white in color. When heated slowly in a melting-point bath, it decomposes at about 180° C. without melting. When plunged into a bath heated to about 200° C., it melts with decomposition. The product may be employed as a germicide, disinfectant, or for similar purpose.

Our invention may be practiced in ways other than those specifically described in the examples. For instance, an aryl-mercuric salt of a lower fatty acid which bears one or more nuclear substituents selected from the class of alkyl, nitro, and halogen substituents, e. g. tolyl-mercuric acetate, nitro-phenyl-mercuric propionate, chloro-phenyl-mercuric butyrate, bromo-phenyl-mercuric butyrate, fluoro-phenyl-mercuric acetate, etc., may be reacted with nitric acid according to our present method to form the corresponding alkyl, nitro, or halogen substituted aryl-mercuric nitrate, e. g. tolyl-mercuric nitrate, etc. Again, an alkyl, nitro, or halogen substituted aromatic hydrocarbon, such as toluene, ortho-xylene, nitrobenzene, chloro-benzene, etc., may be reacted with a solution of mercuric oxide in a lower fatty acid, e. g. acetic acid, propionic acid, butyric acid, etc., and the reacted mixture may be treated with nitric acid, in accordance with procedure similar to that already described, to form the corresponding alkyl-, nitro-, or halo-aryl-mercuric nitrate. However, when an aryl-mercuric nitrate is prepared directly from a substituted aromatic hydrocarbon according to the procedure last mentioned, a mixture of isomeric products is sometimes formed.

Throughout the specification and in the claims where an aryl-mercuric nitrate is referred to it is to be understood that said compound may be the normal or basic salt.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method of making an aryl-mercuric nitrate which comprises reacting nitric acid with an aryl-mercuric salt of a lower fatty acid.

2. The method of making an aryl-mercuric nitrate which comprises reacting nitric acid with an aryl-mercuric salt of a fatty acid selected from the class consisting of acetic and propionic acids.

3. In a method of making an aryl-mercuric nitrate, the step which consists in treating a solution of an aryl-mercuric salt of a lower fatty acid in a solvent which will permit ionization of a polar compound with nitric acid.

4. In a method of making an aryl-mercuric nitrate, the step which consists in treating a solution of a compound selected from the class consisting of aryl-mercuric acetates and aryl-mercuric propionates in the corresponding fatty acid with nitric acid.

5. In a method of making an aryl-mercuric nitrate, the step which consists in treating a solution of an aryl-mercuric acetate in acetic acid with nitric acid in amount representing at least the molecular equivalent of the aryl-mercuric acetate used, said treatment being carried out at such temperature that organic components of the mixture are not appreciably oxidized by the nitric acid.

6. In a method of making an aryl-mercuric nitrate, the steps which consist in treating a solution of an aryl-mercuric acetate in acetic acid with nitric acid in amount representing at least the molecular equivalent of said aryl-mercuric acetate at such temperature that organic components of the mixture are not appreciably oxidized by the nitric acid, then diluting the mixture with sufficient water to precipitate the aryl-mercuric nitrate product and removing the latter from the mixture.

7. The method of making phenyl-mercuric nitrate which comprises reacting a compound selected from the class consisting of phenyl-mercuric acetate and phenyl-mercuric propionate with nitric acid.

8. In a method of making phenyl-mercuric nitrate the step which consists in treating a solution of phenyl-mercuric acetate in acetic acid with nitric acid in amount representing at least the molecular equivalent of said phenyl-mercuric acetate.

9. The method of making alpha-naphthyl-mercuric nitrate which comprises reacting alpha-naphthyl-mercuric acetate with nitric acid.

10. In a method of making alpha-naphthyl-mercuric nitrate, the steps which consist in treating a solution of alpha-naphthyl-mercuric acetate in acetic acid with nitric acid in amount representing at least the molecular equivalent of said alpha-naphthyl-mercuric acetate and separating alpha-naphthyl-mercuric nitrate from the resultant mixture.

11. The method of making 4-biphenyl-mercuric nitrate which comprises reacting 4-biphenyl-mercuric acetate with nitric acid.

12. In a method of making 4-biphenyl-mercuric nitrate, the step which consists in treating a solution of 4-biphenyl-mercuric acetate in acetic acid with nitric acid in amount representing at least the molecular equivalent of said 4-biphenyl-mercuric acetate.

13. 4-biphenyl-mercuric nitrate, having the formula

and decomposing at about 180° C.

14. The method of making phenyl-mercuric nitrate which comprises reacting nitric acid with a phenyl-mercuric salt of a lower fatty acid.

15. In a method of making phenyl-mercuric nitrate, the step which consists in treating with nitric acid a solution of a phenyl-mercuric salt of a lower fatty acid in a solvent which will permit ionization of a polar compound, the nitric acid being employed in a proportion representing at least the molecular equivalent of said phenyl-mercuric salt and the treatment being carried out at such temperature that organic components of the mixture are not appreciably oxidized by the nitric acid.

EDGAR C. BRITTON.
RALPH P. PERKINS.
JOSEPH T. LUNDQUIST.